(12) United States Patent
Fladhammer et al.

(10) Patent No.: US 11,149,785 B2
(45) Date of Patent: Oct. 19, 2021

(54) BALL SOCKET COUPLING ASSEMBLY AND METHOD OF USE

(71) Applicant: Asyst Technologies, LLC, Kenosha, WI (US)

(72) Inventors: Scott T. Fladhammer, Caledonia, WI (US); Michael B. Grimm, Antioch, IL (US)

(73) Assignee: Asyst Technologies L.L.C., Kenosha, WI (US)

( * ) Notice: Subject to any disclaimer, the term of this patent is extended or adjusted under 35 U.S.C. 154(b) by 78 days.

(21) Appl. No.: 16/848,981

(22) Filed: Apr. 15, 2020

(65) Prior Publication Data

US 2020/0355217 A1 Nov. 12, 2020

Related U.S. Application Data

(60) Provisional application No. 62/845,476, filed on May 9, 2019.

(51) Int. Cl.
*F16C 11/06* (2006.01)

(52) U.S. Cl.
CPC ...... *F16C 11/0695* (2013.01); *F16C 11/0685* (2013.01)

(58) Field of Classification Search
CPC ..... F16C 11/06; F16C 11/069; F16C 11/0657; F16C 11/0604; F16C 11/0695;
(Continued)

(56) References Cited

U.S. PATENT DOCUMENTS

| | | | |
|---|---|---|---|
| 3,916,756 A | * | 11/1975 | Yoda ..................... F16B 21/073 24/682.1 |
| 4,689,725 A | * | 8/1987 | Saijo .................... B60Q 1/0683 362/289 |

(Continued)

FOREIGN PATENT DOCUMENTS

| | | |
|---|---|---|
| EP | 0379392 | 7/1990 |
| EP | 2072844 | 7/2012 |
| WO | 2016046484 | 3/2016 |

OTHER PUBLICATIONS

Extended Search Report for European Patent Application No. 20172903.5 dated Oct. 11, 2020.

*Primary Examiner* — Daniel J Wiley
(74) *Attorney, Agent, or Firm* — James Joyce; Godfrey & Kahn, S.C.

(57) ABSTRACT

A coupling assembly is provided that includes a ball socket having a central socket axis, the ball socket includes a lower body portion extending to an upper flange portion, wherein the body portion and flange portion are at least partially segmented by a plurality of longitudinal socket slots to form a plurality of longitudinally extending arms, further included are a plurality of longitudinally extending journaling ribs protruding radially from the body portion, wherein the ribs include an upper rib portion and a lower rib portion, and wherein the upper rib portion has a greater radial width than the lower rib portion, a plurality of wedges extending from the body portion, a plurality of engagement tabs extending from the body portion, each having a tab end portion, and a ball stud engagement cavity centrally formed between the arms for receiving and pivotably securing a ball head of a ball stud therein.

20 Claims, 11 Drawing Sheets

(58) Field of Classification Search
CPC ........ F16B 5/0621; F16B 5/065; F16B 21/07; F16B 21/075
See application file for complete search history.

(56) References Cited

U.S. PATENT DOCUMENTS

| | | | | |
|---|---|---|---|---|
| 5,580,204 | A * | 12/1996 | Hultman | F16B 5/065 |
| | | | | 24/297 |
| 6,209,175 | B1 * | 4/2001 | Gershenson | F16B 5/065 |
| | | | | 24/297 |
| 6,247,868 | B1 | 6/2001 | Burton | |
| 6,692,176 | B1 | 2/2004 | Fladhammer | |
| 6,758,622 | B2 | 7/2004 | Burton | |
| 6,837,716 | B1 * | 1/2005 | Brazas | B60Q 1/06 |
| | | | | 403/122 |
| 7,396,183 | B2 * | 7/2008 | Dona Contero | B60T 7/06 |
| | | | | 403/122 |
| 9,140,294 | B2 * | 9/2015 | Burton | F16C 11/0657 |
| 9,458,868 | B2 * | 10/2016 | Metten | F16B 5/0621 |
| 9,987,972 | B2 | 6/2018 | Burton | |
| 9,995,331 | B2 * | 6/2018 | Heimann | F16B 21/07 |
| 11,067,117 | B2 * | 7/2021 | Recker | F16C 11/0657 |

* cited by examiner

BALL SOCKET COUPLING ASSEMBLY AND METHOD OF USE

CROSS-REFERENCE TO RELATED APPLICATION

This application claims priority to U.S. Provisional Patent Appl. No. 62/845,476 filed on May 9, 2019, the disclosure of which is incorporated herein by reference in entirety for all purposes.

FIELD OF THE INVENTION

The invention relates generally to connection systems. More particularly, the invention relates to a ball socket coupling assembly.

BACKGROUND

It is common in automobiles to use a ball joint assembly consisting of a ball socket and mating male spherical ball (ball stud) to secure and aid in the positioning of a light source in a headlamp or fog lamp assembly. As newer technologies and automotive style initiatives have developed, headlamp connection systems have also had to develop to meet the needs of this evolution. Some changes include the need for dynamic travel after the system has been initially installed. Others include a change in headlamp systems, like LED style systems, that require consistency at elevated temperatures, increased off-axis angle usage, and increased system retention forces to offset the increased mass of LED style systems. Further, as the design of motor vehicle systems continue to develop, the requirements for improvements with automotive interconnection components like ball sockets also continue to develop.

One specific change desired is a reduction in the spherical diameter of the ball head of a ball stud. A decrease in ball diameters can be utilized to address specific requirements like material, weight, and size reduction. Unfortunately, these reductions in size are found to be in contrast to other newer requirements such as off-axis travel, increased temperature, and increased pull out forces, thereby making retaining adequate hold on a ball stud more difficult, as a smaller ball head diameter reduces the available retention surface area. In an effort to address the smaller retention area, attempts have been utilized to apply undercuts or lock-edges to a ball head to provide additional resistance from extraction. The undercuts can in some circumstances function satisfactorily as long as the pull force is axial, but when the system is required to rotate off-axis, these undercuts or lock-edge are foreshortened and lose their effectiveness, either restricting the system from off-axis rotation or escaping the associated socket locking geometries altogether. Along with improved retention, the ability to gain drive access on the ball stud end when installed into the socket is also desired. Although current ball sockets exist that may allow drive access to the ball stud end, these existing products fail to couple this access with meeting the desired retention in off-axis angle usage.

There are many prior designs for ball sockets, including the devices disclosed in U.S. Pat. Nos. 6,692,176; 6,247,868; 6,758,622; and 9,987,972, although none of these designs solve the aforementioned shortcomings. As such, there is a need for an improved ball socket coupling assembly to address the aforementioned problems, among other improvements.

SUMMARY OF THE INVENTION

In at least some embodiments, a coupling assembly is provided that includes a ball socket having a central socket axis, the ball socket further including: a lower body portion extending to an upper flange portion, wherein the body portion and flange portion are at least partially segmented by a plurality of longitudinal socket slots to form a plurality of longitudinally extending arms; a plurality of longitudinally extending journaling ribs protruding radially from the body portion, wherein the ribs include an upper rib portion and a lower rib portion, and wherein the upper rib portion has a greater radial width than the lower rib portion; a plurality of wedges extending from the body portion; a plurality of engagement tabs extending from the body portion, each having a tab end portion; and a ball stud engagement cavity centrally formed between the arms for receiving and pivotably securing a ball head of a ball stud therein.

In at least some other embodiments, a method of coupling a ball stud, a ball socket, and a substrate is provided that includes: providing a ball socket comprising: a lower body portion extending to an upper flange portion, wherein the body portion and flange portion are at least partially segmented by a plurality of longitudinal socket slots to form a plurality of longitudinally extending arms; a plurality of longitudinally extending journaling ribs protruding radially from the body portion, wherein the ribs include an upper rib portion and a lower rib portion, and wherein the upper rib portion has a greater radial width than the lower rib portion; a plurality of wedges extending along the body portion; a plurality of engagement tabs extending along the body portion, each having a tab end portion; and a ball stud engagement cavity centrally formed between the arms for receiving and pivotably securing a ball head of a ball stud therein; aligning the plurality of journaling ribs with a plurality of journaling slots in a substrate having a substrate aperture extending therethrough; inserting the ball socket through the substrate aperture until the upper rib portions abut a substrate top surface; inserting the ball head of the ball stud into the ball stud engagement cavity of the ball socket; and further inserting the ball socket through the substrate aperture until the flange portion of the ball socket abuts the substrate top surface and the tab end portions of the engagement tabs are positioned on a bottom surface of the substrate.

Other embodiments, aspects, and features of the assembly will be understood and appreciated upon a full reading of the detailed description and the claims that follow.

BRIEF DESCRIPTION OF THE DRAWINGS

Embodiments of the invention are disclosed with reference to the accompanying drawings and are for illustrative purposes only. The invention is not limited in application to the details of construction or the arrangement of the components illustrated in the drawings. The invention is capable of other embodiments or of being practiced or carried out in other various ways.

DETAILED DESCRIPTION

In at least some embodiments, the invention relates to a ball socket coupling assembly that utilizes a multi-stage assembly process to secure a ball stud to a substrate while allowing off-axis angular displacement and access through an end of the ball socket to engage a ball head drive portion on the ball stud after assembly into the ball socket, while in other embodiments, the invention includes a ball socket configured for engagement with a substrate and for securing a ball stud at least partially therein.

Figure 1:
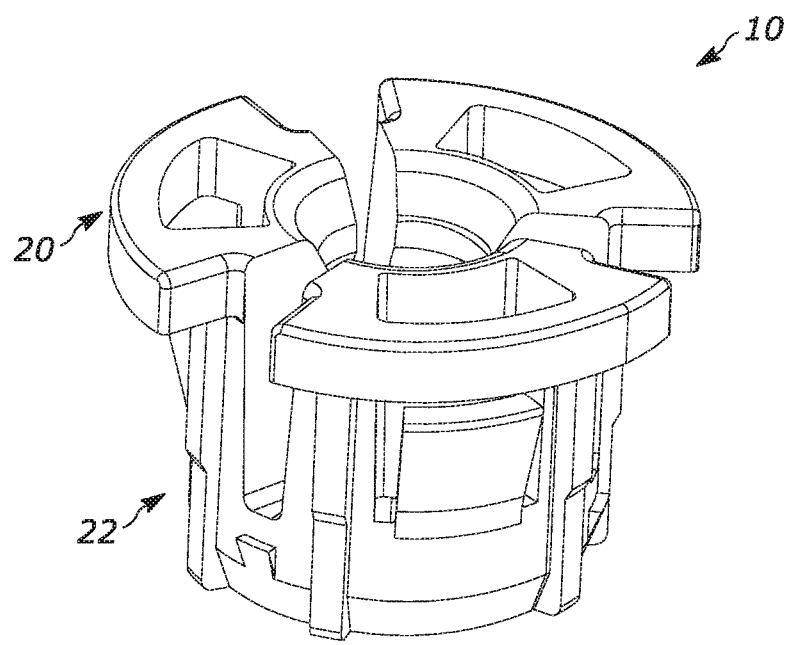
FIG. 1 is a front top perspective view of an exemplary ball socket.
Figure 2:
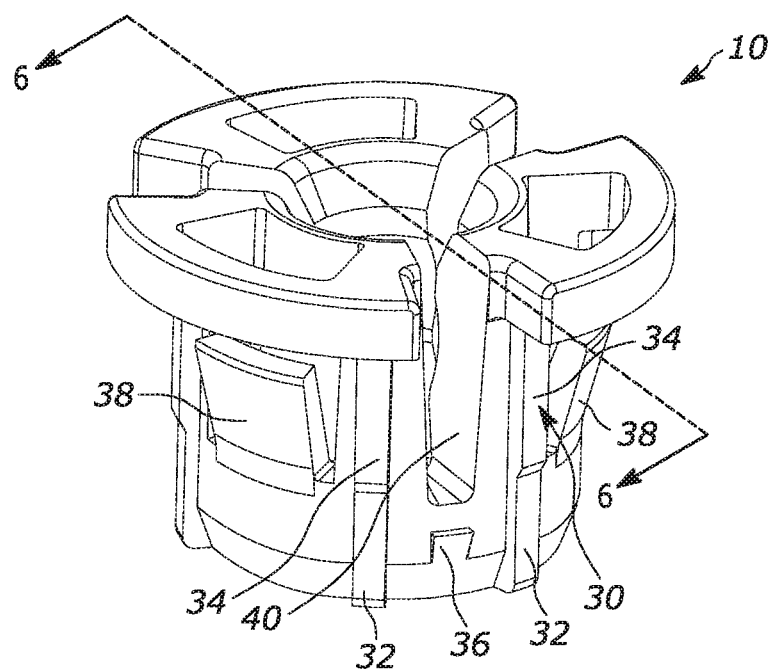
FIG. 2 is a rear top perspective view of the ball socket.
Figure 3:
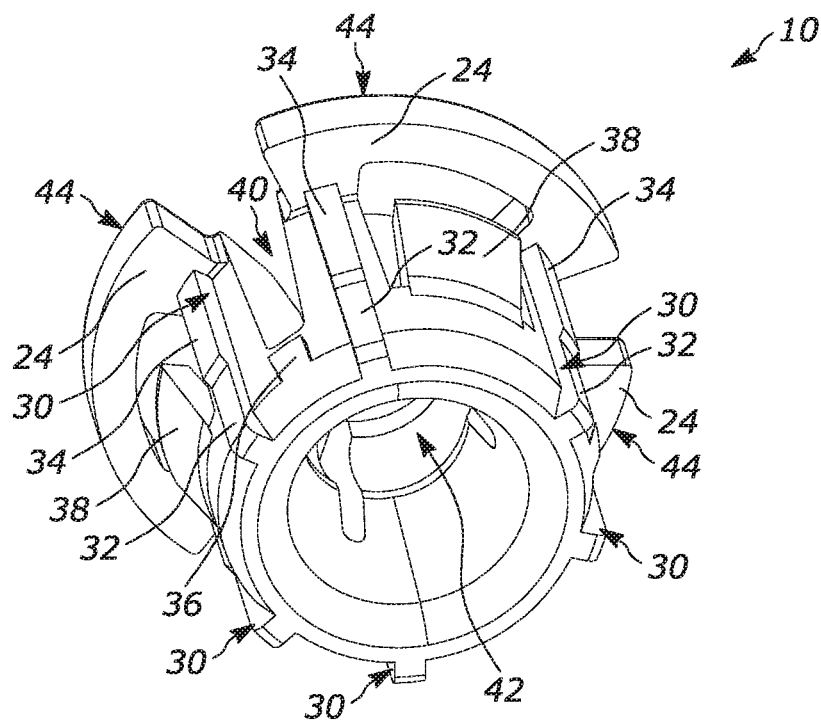
FIG. 3 is a rear bottom perspective view of the ball socket.
Figure 4:
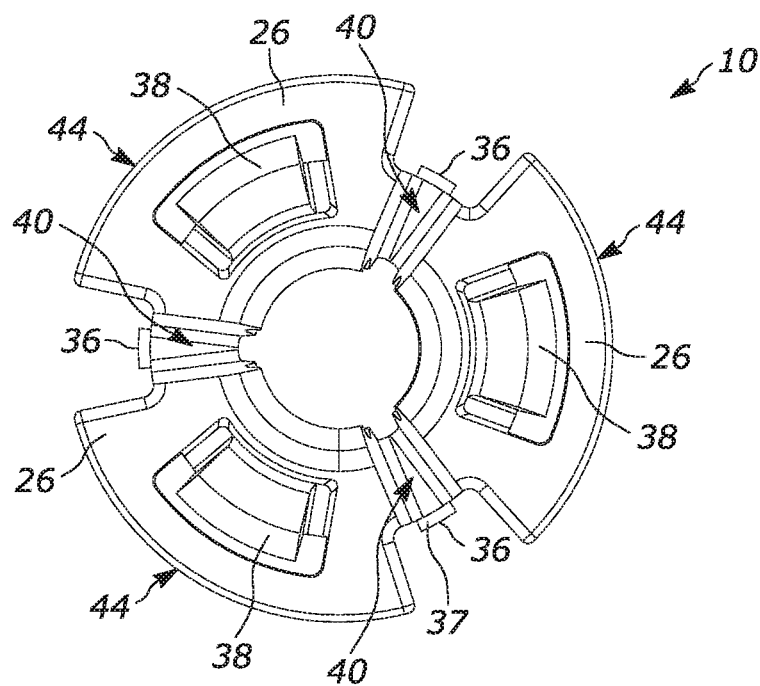
FIG. 4 is a top view of the ball socket.
Figure 5:
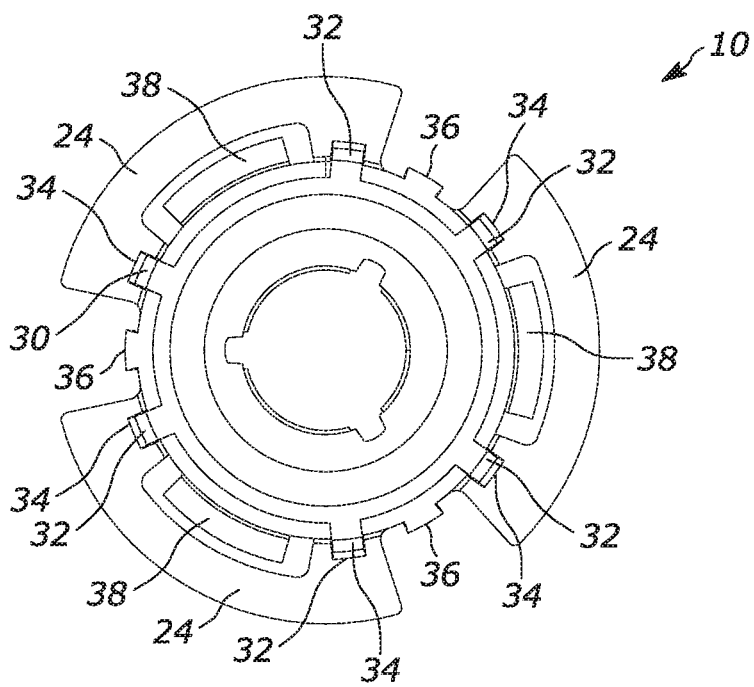
FIG. 5 is a bottom view of the ball socket.
Figure 6:
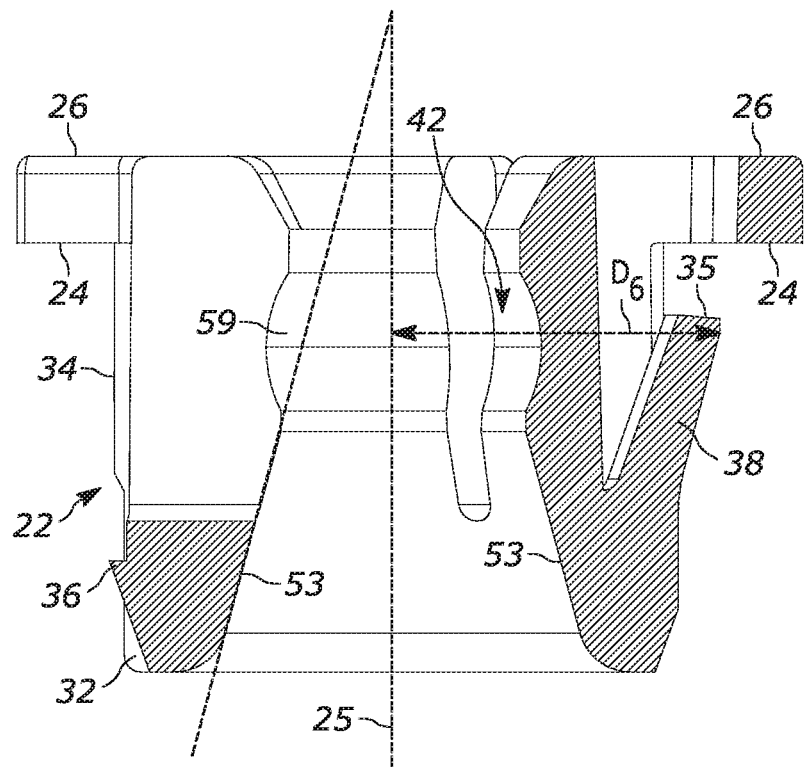
FIG. 6 is a sectional side view of the ball socket taken along line 6-6 of FIG. 2.
Figure 7:
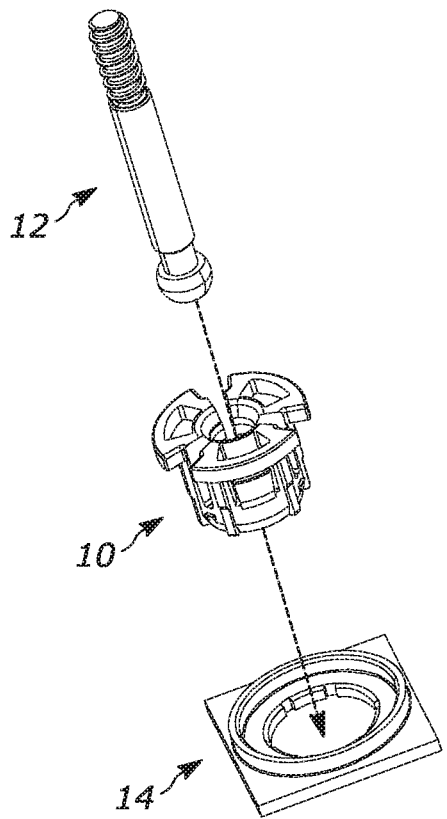
FIG. 7 is an exploded perspective view of the ball socket of FIG. 1 in combination with an exemplary ball stud and an exemplary substrate, to form an unassembled exemplary coupling assembly.

FIGS. 1-6 illustrate various exemplary views of a ball socket 10. The ball socket 10 is configured for engagement with a ball stud 12 and a receiving substrate 14 to form a coupling assembly 16 as shown in exploded view in FIG. 7, wherein the coupling assembly 16 provides adjustable securement of a lamp assembly to a vehicle.

The ball socket 10 includes an upper flange portion 20 and a longitudinally extending lower body portion 22. The flange portion 20 extends outward beyond the body portion 22, and includes a flange portion bottom surface 24 and a flange portion top surface 26. In at least some embodiments, the flange portion bottom surface 24 is planar. In at least some embodiments, the body portion 22 is generally cylindrical, although in other embodiments other shapes and variations thereof can be utilized.

The ball socket 10 includes a plurality of longitudinally extending journaling ribs 30. In at least some embodiments, the ribs 30 extend the length of the body portion 22, terminating at the flange portion 20, while in some other embodiments they can extend more or less. In at least some embodiments, the ribs 30 include a lower rib portion 32 and an upper rib portion 34, wherein at least some of the upper rib portions 34 have a greater radial width than the lower rib portions 32, as discussed in greater detail below. In at least some embodiments, the ball socket 10 further includes a plurality of retention wedges 36, engagement tabs 38, socket slots 40, and a ball stud engagement cavity 42. The socket slots 40 extend longitudinally through the flange portion 20 and into part of the body portion 22, and can vary in number and serve to at least partially segment the ball socket 10 into a plurality of flexible arms 44, to allow for the flange portion 20 (and in part, the body portion 22) to flex radially outward under force. For clarity, when segmented into a plurality of arms 44 by the socket slots 40, each arm 44 includes some of the flange portion 20. In at least some embodiments, the ball socket 10 can include three equally spaced arms 44, while in other embodiments, more or less arms can be provided, either spaced equally apart or otherwise. Further, in at least some embodiments, each arm 44 includes the flexible engagement tab 38 and a pair of ribs 30. In at least some embodiments, the wedge 36 is provided on the body portion 22 below each socket slot 40.

Figure 8:
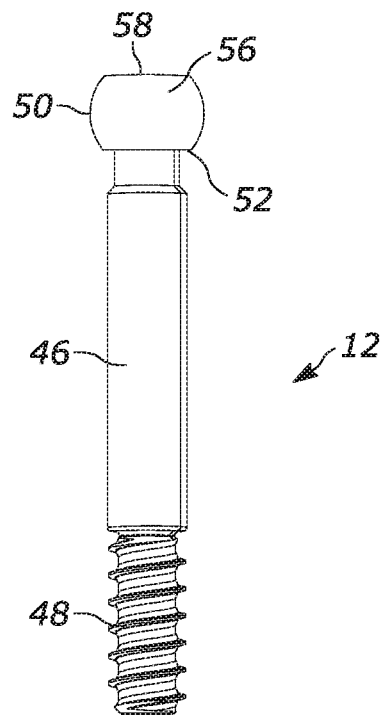
FIG. 8 is a side view of the ball stud.

Referring to FIG. 8, a side view of the ball stud 12 is provided illustrating an exemplary embodiment. The ball stud 12 can include various configurations well known in the automotive industry, such as for use with various types of lamp adjuster assemblies, which generally include a shaft 46 having a threaded portion 48 and a ball head 50. In at least some embodiments, the ball head 50 can be substantially spherical, and in some further embodiments, it can also include an undercut portion 52, as well as a ball head drive portion 54 (FIG. 17) for engagement with an adjustment tool (e.g. a torx driver). As shown, the ball head 50 further includes a sidewall 56 that can extend circumferentially around the ball head 50 between the undercut portion 52 and a ball head front surface 58. A circumferential cavity wall 59 (FIG. 6) is formed in the ball socket 10 to form at least in part, the ball stud engagement cavity 42. The cavity wall 59 spans across the arms 44, such that each arm includes a portion of the cavity wall 59. The ball stud engagement cavity 42 is sized and shaped to substantially matingly receive and pivotably secure at least the sidewall 56 of the ball head 50. The various features illustrated represent one of multiple geometries that could be utilized to aid in the orientation and assembly process.

Figure 9:
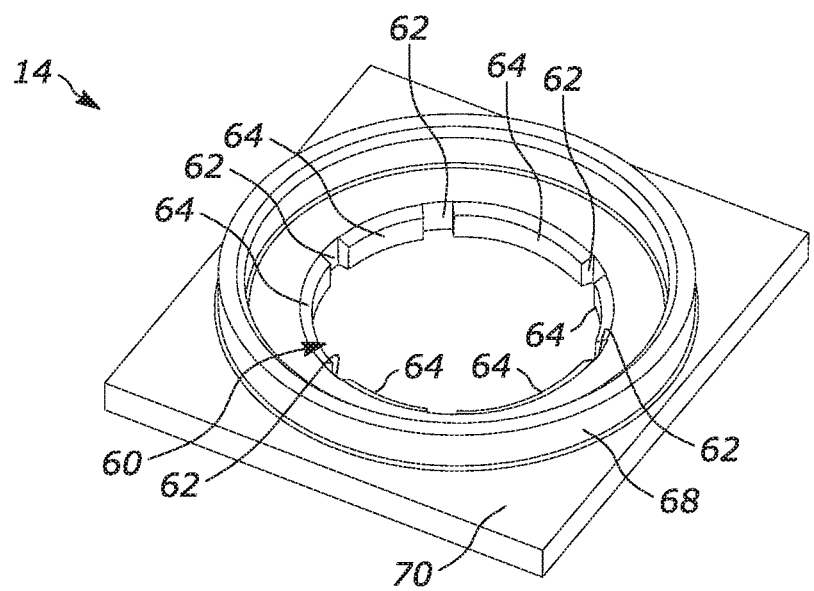
FIG. 9 is a perspective view of the substrate.
Figure 10:
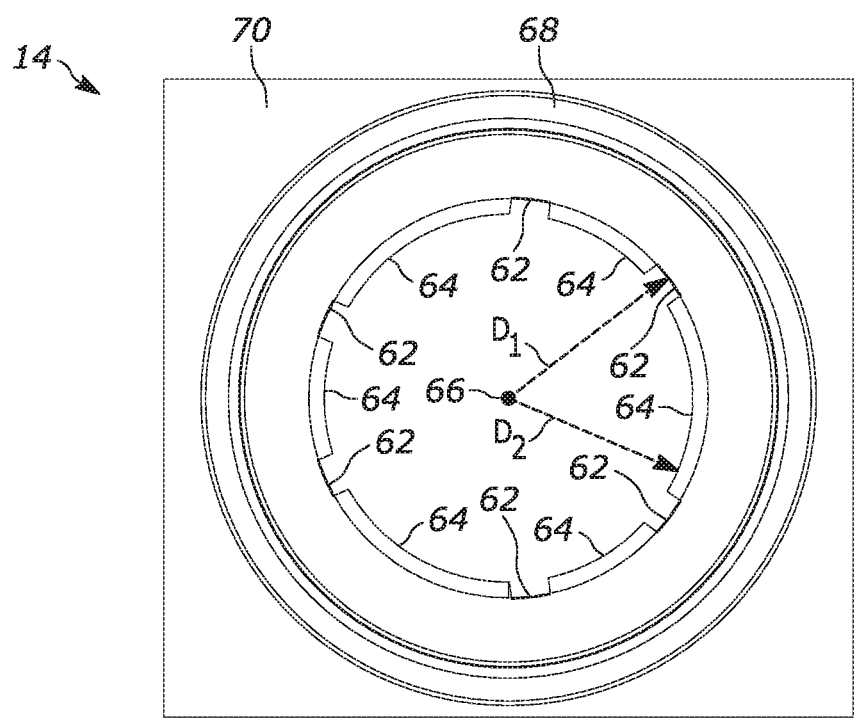
FIG. 10 is a top view of the substrate.

Referring to FIGS. 9 and 10, an exemplary embodiment of the substrate 14 is illustrated. It shall be understood that the substrate 14 is representative of a portion of a structure to which it is desirable to couple to the ball stud 12 therewith. For example, the substrate 14 can represent a portion of an automotive headlamp housing. The substrate 14 can take many forms, although for illustrative purposes only, it has been shown limited to a square portion. In at least some embodiments, the substrate 14 includes a substrate aperture 60 configured for securably receiving the ball socket 10 therein. The substrate aperture 60 includes a plurality of journaling slots 62 for receiving the aforementioned ribs 30 therein. The journaling slots 62 are provided between a plurality of inwardly extending radial protrusions 64. In at least some embodiments, the radial protrusions 64 are merely the inwardly extending portions of the substrate formed by the removal of the material to form the journaling slots 62, while in other embodiments, the radial protrusions 64 can be specially formed, shaped, and sized as desired. In at least some embodiments the protrusions 64 are beveled adjacent the substrate top surface 70 to ease insertion force.

Figure 11:
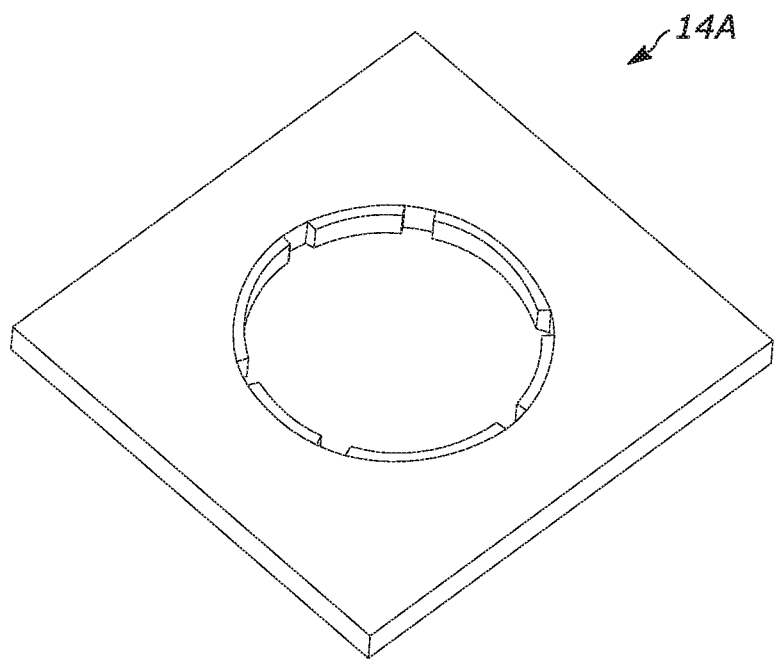
FIG. 11 is a perspective view of another exemplary embodiment of the substrate.

As shown in FIG. 10, for reference, a radial distance D1 is identified that extends from a substrate aperture center 66 to the journaling slots 62, and a radial distance D2 is identified that extends from the substrate aperture center 66 to each protrusion 64. The substrate 14 can further include a shroud portion 68 that extends outward from a substrate top surface 70, wherein the shroud portion 68 can further stabilize the ball socket 10 when installed. In at least some embodiments, the shroud portion 68 can take the form of a circular ridge, while in other embodiments, other shapes can be utilized. The shroud portion 68 shown represents a standard geometry that requires no orientation of the ball socket 10 during assembly. If controlled orientation of the ball socket 10 is desired, the addition of an orientation feature on the substrate 14 could be added in multiple geometries to meet this requirement. In at least some embodiments, the shroud portion 68 can be omitted, such as shown with substrate 14A in FIG. 11, which includes the substrate aperture 60, plurality of journaling slots 62, and protrusions 64.

The coupling assembly 16 is configured to be installed in three stages. In the first stage of assembly, the ball socket 10 is intended to be inserted into the substrate aperture 60 such that the ball socket 10 engages with the substrate 14, then in the second stage of assembly, the ball stud 12 is inserted into the ball stud engagement cavity 42 of the ball socket 10, finally in a third stage of assembly, the ball socket 10 is pushed further into the substrate aperture 60.

Figure 12:
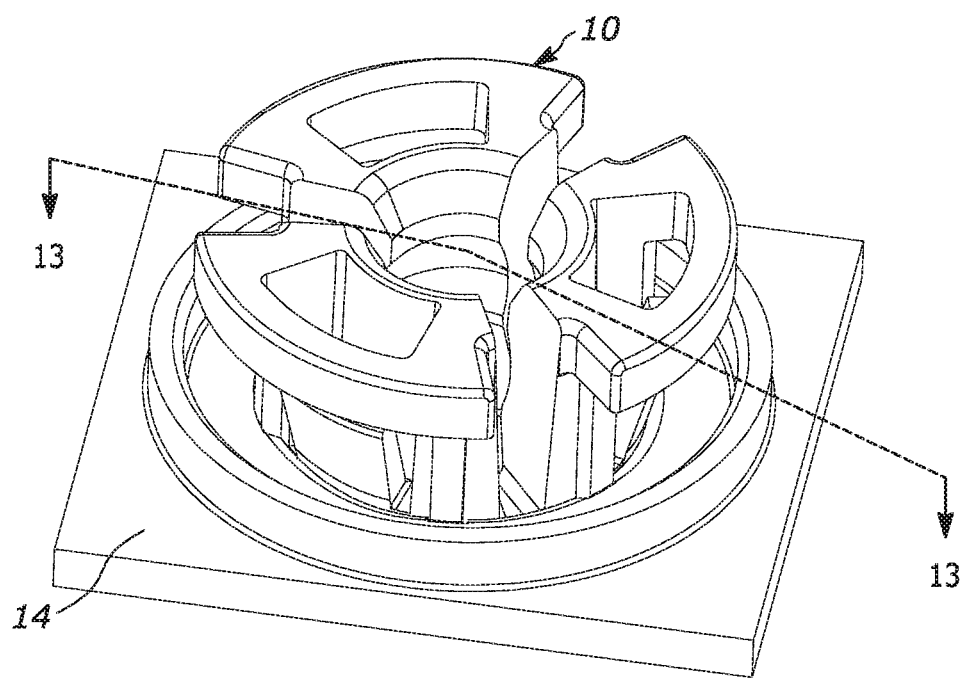
FIG. 12 is a perspective view of an exemplary first stage assembly position of the ball socket in the substrate.
Figure 13:
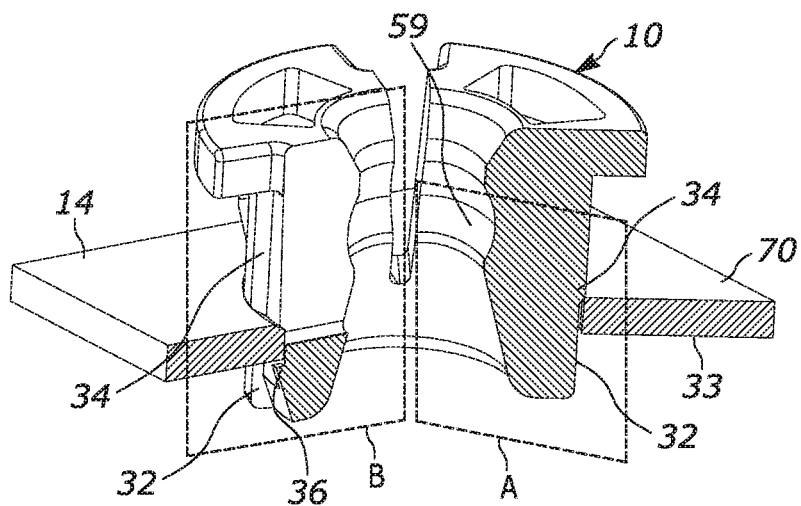
FIG. 13 is a perspective section view of the ball socket in the substrate taken along lines 13-13 of FIG. 12.

FIGS. 12 and 13 include a perspective and a sectioned perspective view illustrating an exemplary first stage assembly position of the ball socket 10 in the substrate 14. In this stage, the ball socket 10 is journaled into the substrate 14 by inserting the ribs 30 into the journaling slots 62 and continuing insertion until the upper rib portions 34 abut the substrate top surface 70, as seen in FIG. 13. Additionally, during insertion, the wedges 36 are forced through the substrate aperture 60 past the protrusions 64. Once through the substrate aperture 60, a planar wedge top surfaces 37 of each wedge 36 is in position to abut a substrate bottom surface 33 of the substrate 14. In this position, the ball socket 10 is locked into a first stage assembly position with the upper rib portions 34 and the wedges 36 in abutment or proximate abutment with the substrate 14, thereby affixing the ball socket 10 to the substrate 14.

Figure 14:
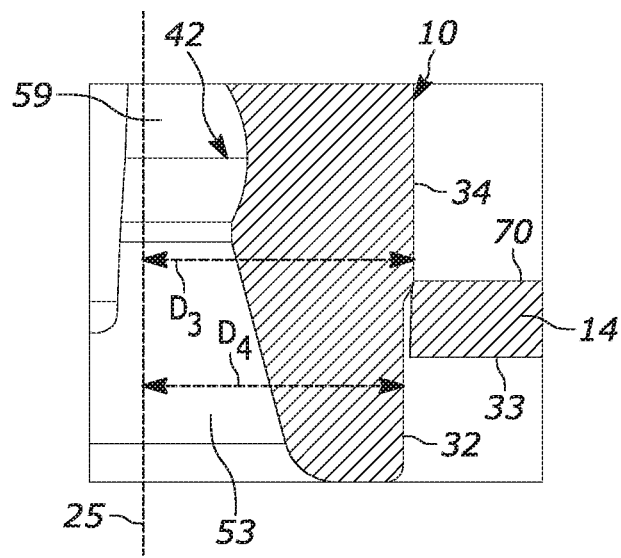
FIG. 14 is an enlarged view of a portion of FIG. 13, taken along line A.
Figure 15:
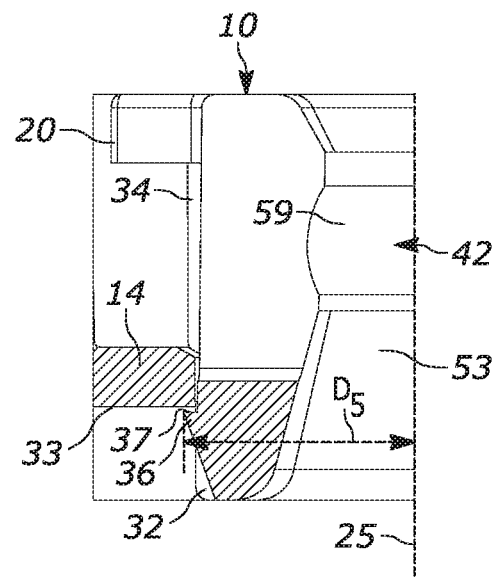
FIG. 15 is an enlarged view of a portion of FIG. 13, taken along line B.

FIGS. 14 and 15 show sectioned views of the interaction of features on the ball socket 10 and the substrate 14 in the first stage assembly position. As shown in FIG. 14, the upper rib portions 34 extend a radial distance D3 (relative to a socket central axis 25 of the ball socket 10) that is greater than the radial distance D4 of the lower rib portions 32. The radial distance D4 is equal to or substantially equal to radial distance D1 to allow the lower rib portions 32 to pass easily through the journaling slots 62, while the upper rib portions 34 with their larger radial diameter D3 cause abutment with the substrate top surface 70. As shown in FIG. 15, the wedges 36 are positioned at a radial distance D5 (relative to the socket central axis 25), which is greater than D4, so that the wedges 36, once forcibly pushed through the aperture 60 via their angled side, the wedge top surface 37 engages the substrate bottom surface 33 to prevent or substantially prevents removal of the ball socket 10 from the substrate 14.

Figure 17:
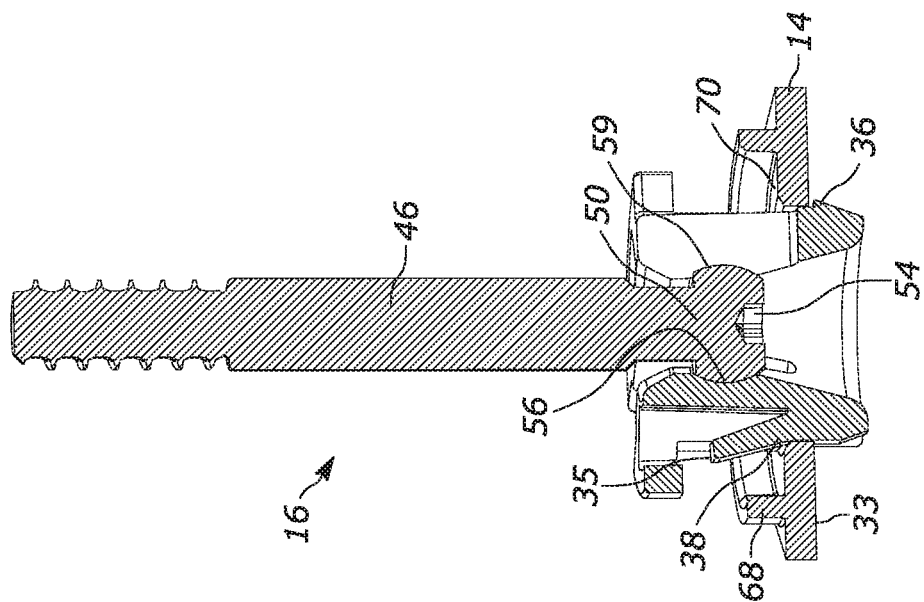
FIG. 17 is a side sectional view of the coupling assembly taken along line 17-17 of FIG. 16.
Figure 16:
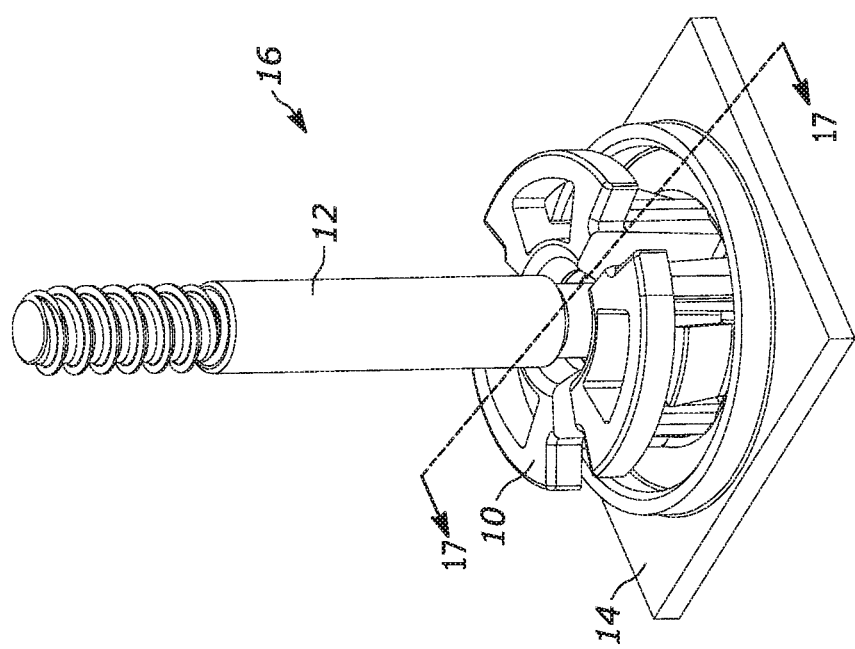
FIG. 16 is a perspective view of the coupling assembly in an exemplary second stage assembly position, after the ball stud has been inserted into the ball socket, which is already partially installed in the substrate.

FIG. 16 is a perspective view demonstrating a second stage assembly position of the coupling assembly 16, after the ball stud 12 has been inserted into the ball stud engagement cavity 42 of the ball socket 10, and FIG. 17 is a side sectional view taken along line 17-17 of FIG. 16. The abutment of the upper rib portions 34 with the substrate 14 provides a controlled level of resistance to allow the ball stud 12 to be pressed into the ball socket 10 while maintaining the first stage assembly position of the ball socket 10 in the substrate 14. At the first stage assembly position, the ball socket 10 is allowed to flex open to receive the ball head 50 of the ball stud 12 with a force less than the resistance created by the interaction between the upper rib portions 34 and the substrate 14. The force required to install the ball head 50 into the ball socket 10 can in at least some embodiments, be controlled by adjusting the length of the socket slots 40 on the ball socket 10, wherein longer slots allow for more flexing and therefore decreased resistance to insertion, and shorter slots decrease flexing and therefore increase the resistance during insertion of a ball head 50 into the ball stud engagement cavity 42.

As noted above, the ball socket 10 includes flexible engagement tabs 38 that protrude outwards relative to the socket central axis 25, these tabs 38 are positioned a distance above the wedges 36 and are utilized primarily during third stage assembly. The tabs 38 extend outward to a tab end portion 35, and project out a radial distance D6 (see FIG. 6) that is sufficient to engage the substrate bottom surface 33 after full insertion of the ball socket 10 into the substrate 14.

FIGS. 18-21 illustrate an exemplary third stage assembly position for the coupling assembly 16. After insertion of the ball head 50 into the ball stud engagement cavity 42 (as illustrated in FIG. 16), third stage assembly is performed by applying assembly force on the ball stud 12 sufficient to overcome the controlled resistance facilitated by the interference of the upper rib portions 34 on the substrate 14, as well as the resistance needed to force the tabs 38 inward (as they pass along the protrusions 64 of the substrate 14) and through the substrate aperture 60, thereby allowing the ball socket 10 to be forcefully seated in the substrate 14. In the third stage assembly position, ball stud 12 is pivotably retained in the ball socket 10 by the interaction of the ball head 50 and the ball stud engagement cavity 42, and the ball socket 10 is secured to the substrate 14 by the tab end portions 35 engaging with the substrate bottom surface 33 and flange portion bottom surface 24 abutting the substrate top surface 70. Further, the arms 44 of the ball socket 10 are constrained against the substrate aperture 60, which prevents or substantially prevents, the arms 44 from flexing open when a pull out force is applied to the ball stud 12, thereby providing high levels of retention force, particularly for a ball stud with an undercut portion 52, or without at any allowable axial angle.

Figure 19:
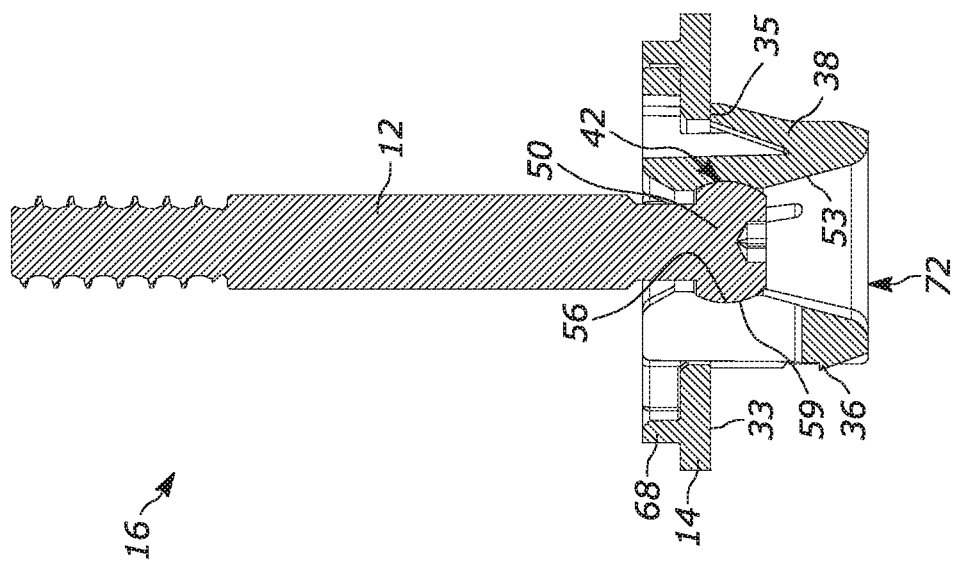
FIG. 19 is a side sectional view of the coupling assembly taken along line 19-19 of FIG. 18.
Figure 18:
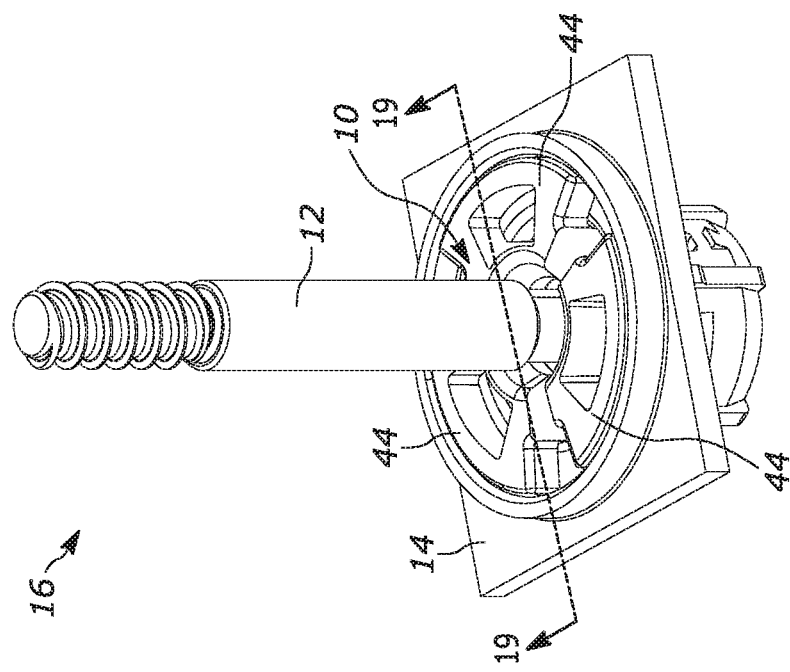
FIG. 18 is a perspective view of the coupling assembly in an exemplary third stage assembly position, after the ball socket has been fully installed in the substrate.
Figure 22:
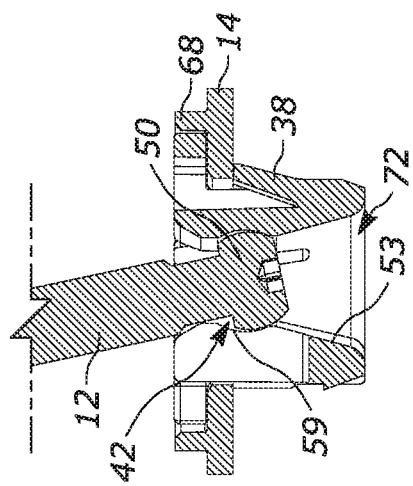
FIG. 22 is a side sectional view of the coupling assembly of FIG. 19, but with the ball stud rotated off the central axis of the ball socket.
Figure 21:
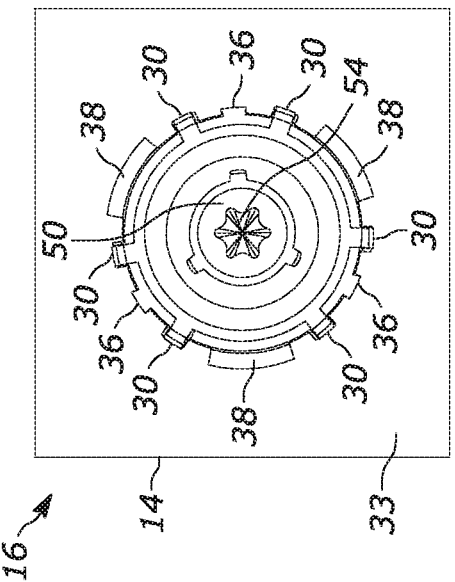
FIG. 21 is a bottom view of the coupling assembly of FIG. 19.
Figure 20:
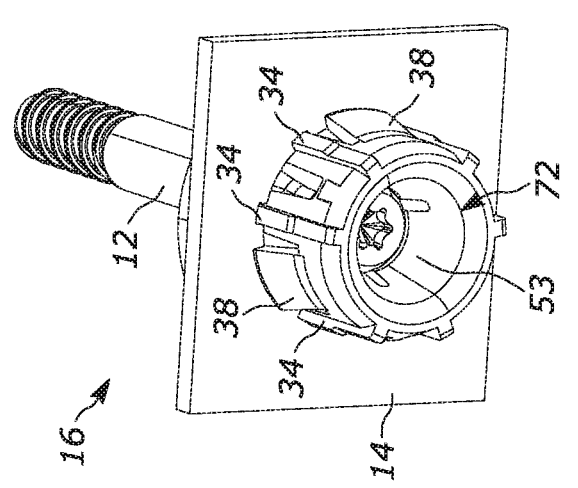
FIG. 20 is a bottom perspective view of the assembly of FIG. 18 further showing the exemplary interface of the ball socket with the substrate in a third stage assembly position.

As shown in FIGS. 19 and 22, the ball socket 10 includes a circular lower inner wall 53 that angles outward as it extends away from the ball stud engagement cavity 42, to form an expanding conical opening 72. The lower inner wall 53 provides angled access to the ball head drive portion 54 when the ball stud 12 is both centered and off-center. More particularly, when the ball stud 12 is substantially centered (extending substantially along the socket central axis 25) (FIG. 19) access for an adjustment tool to be inserted into the opening 72 and engage the ball head drive portion 54 is readily available. In addition, as seen in FIG. 22, even when the ball stud 12 is off-center (not extending substantially along the socket central axis 25) access to the ball head drive portion 54 by an adjustment tool is maintained.

Figure 23:
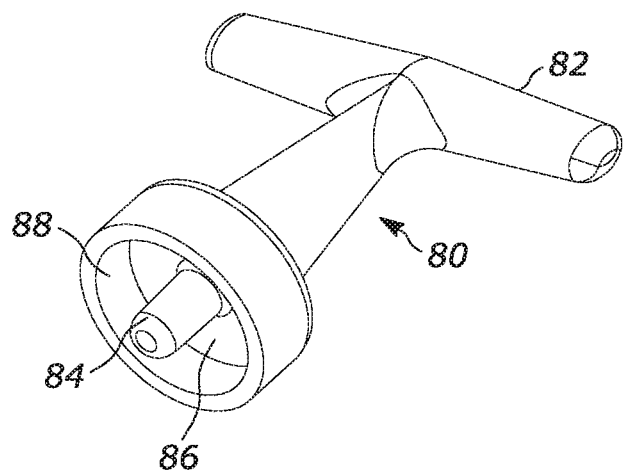
FIG. 23 is a perspective view of an installation tool that can be utilized in a first stage of assembly.
Figure 24:
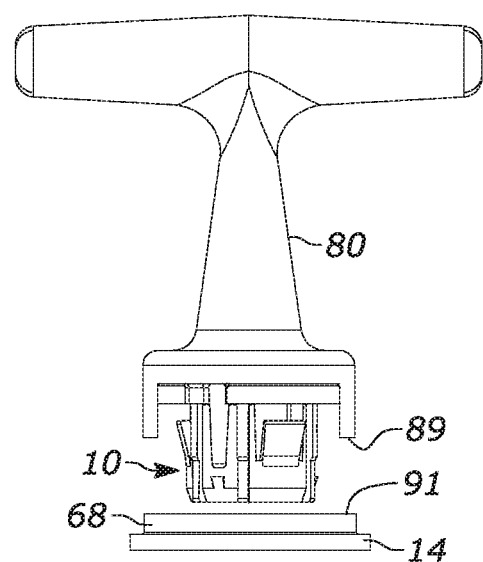
FIG. 24 is a side view of the ball socket seated inside the installation tool and aligned with the substrate for the first stage of assembly.
Figure 25:
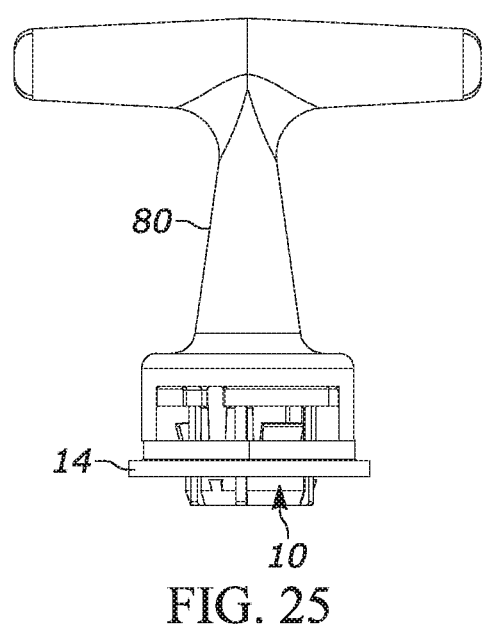
FIG. 25 is a side view showing the final position of the installation tool after it seats the ball socket in the first stage assembly position in the substrate.

The ball socket 10 can be installed in the substrate 14 using several methods. As shown in FIGS. 23-25, in at least some embodiments, a ball socket installation tool can be provided to assist with seating the ball socket 10 within the substrate 14 during first stage assembly. The tool 80 is configured to maintain the static spacing of the arms 44 during installation, so as to prevent the arms 44 from flexing inward as the wedges 36 are forced past the protrusions 64. FIG. 23 is a perspective view of an exemplary installation tool 80, wherein in at least some embodiments, the installation tool 80 can include a handle 82, a center post 84 that extends from a tool upper surface 86, and a circumferential tool shroud 88 sized to surround the flange portion 20 of the ball socket 10. FIG. 24 is a side view of the ball socket 10 engaged with the installation tool 80 prior to engagement with the substrate 14. More particularly, the center post 84 of the tool 80 is positioned inside the ball socket 10 and between the arms 44 preventing the arms 44 from moving inward, and the flange portion top surface 26 of the flange portion 20 is positioned against the tool upper surface 86 of the tool 80 to allow an even downward force to be applied by the installation tool 80. Accordingly, the center post 84 is sized and shaped to maintain the arms 44 in their uninstalled static position. FIG. 25 is a side view of the ball socket 10 engaged with the installation tool 80 after the ball socket 10 has been inserted into the substrate aperture 60 as per first stage assembly. The tool shroud 88 is shown in FIGS. 24 and 25 with a transparent front portion to better illustrate the engagement between the ball socket 10 and the installation tool 80. In FIG. 25 a bottom surface 89 of the tool shroud 88 is shown to be in contact with a top surface 91 of the shroud portion 68 of the substrate 14, wherein the contact serves to control the installation position (i.e., height) of the ball socket 10 in the substrate 14.

The various features illustrated and described represent one or more of multiple geometries that could be utilized to aid in the orientation and assembly process, for example, the shapes and sizes of the wedges, tabs, ribs, etc. can be modified to suit desired applications. In addition, the specific placement of such features can also be modified. In at least some embodiments, the components of the invention can be comprised of any one of or a combination of various materials, such as plastic, steel, etc.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. A coupling assembly comprising:
a ball socket having a central socket axis, the ball socket comprising:
a lower body portion extending to an upper flange portion, wherein the lower body portion and upper flange portion are at least partially segmented by a plurality of longitudinal socket slots to form a plurality of longitudinally extending arms;
a plurality of longitudinally extending journaling ribs protruding radially from the lower body portion, wherein the ribs include an upper rib portion and a lower rib portion, and wherein the upper rib portion has a greater radial width than the lower rib portion;
a plurality of retention wedges extending radially outwardly from the lower body portion;
a plurality of engagement tabs extending from the lower body portion, each having a tab end portion; and
a ball stud engagement cavity centrally formed between the arms for receiving and pivotably securing a ball head of a ball stud therein.

2. The coupling assembly of claim 1, wherein the ball socket further includes a circular lower inner wall that angles outward relative to the central socket axis as it extends away from the ball stud engagement cavity, to form an expanding conical opening.

3. The coupling assembly of claim 1, wherein the ball socket includes three socket slots and three arms, and wherein each arm includes an engagement tab positioned between a pair of distinct adjacent journaling ribs.

4. The coupling assembly of claim 1, further comprising the ball stud having a shaft with the ball head at an end, wherein the ball head is pivotably securable in the ball stud engagement cavity and includes an undercut portion, a ball head front surface, a sidewall extending circumferentially around the ball head, and a ball head drive portion for engagement with an adjustment tool.

5. The coupling assembly of claim 1, further comprising the ball stud having a shaft with the ball head at an end, wherein the ball head is pivotably securable in the ball stud engagement cavity and includes a ball head front surface, and a sidewall extending circumferentially around the ball head.

6. The coupling assembly of claim 5, further comprising a substrate, the substrate comprising a substrate aperture extending therethrough and a plurality of journaling slots, wherein the ribs are matingly receivable within the plurality of journaling slots and the ball socket is securable within the substrate aperture with the ball head pivotably secured in the ball stud engagement cavity.

7. The coupling assembly of claim 5, further comprising a substrate, the substrate comprising a substrate top surface, a substrate bottom surface, a substrate aperture extending therethrough, a plurality of journaling slots, and a plurality of inwardly extending radial protrusions, wherein the ribs are matingly receivable within the plurality of journaling slots and the ball socket is insertable within the substrate aperture.

8. The coupling assembly of claim 7, wherein the substrate further includes a cylindrical shroud extending from the substrate top surface, and wherein the shroud is sized to receive the flange portion therein.

9. The coupling assembly of claim 7, wherein the ball socket is securable to the substrate in a first stage assembly position, with the lower rib portions situated in the plurality of journaling slots, the upper rib portions situated adjacent the substrate top surface, and the retention wedges situated under the radial protrusions adjacent the substrate bottom surface.

10. The coupling assembly of claim 9, wherein the upper rib portions are in abutment with the substrate top surface and the retention wedges are in abutment with radial protrusions.

11. The coupling assembly of claim 9, wherein the ball head is positioned in the ball stud engagement cavity while the ball socket is in the first stage assembly position.

12. The coupling assembly of claim 11, wherein the ball socket is further securable to the substrate in a third stage assembly position with the upper rib portions positioned inside the plurality of journaling slots, a flange portion bottom surface in abutment with the substrate top surface, and the tab end portions of the engagement tabs are positioned under the radial protrusions.

13. The coupling assembly of claim 12, wherein the ball socket includes three socket slots and three arms.

14. The coupling assembly of claim 13, wherein the ball socket further includes a circular lower inner wall that angles outward relative to the central socket axis as it extends away from the ball stud engagement cavity to form a conical opening.

15. The coupling assembly of claim 14, wherein the ball head further includes a ball head drive portion for engagement with an adjustment tool, and the substrate further includes a cylindrical shroud extending from the substrate top surface, wherein the shroud is sized to receive the flange portion therein.

16. A method of coupling a ball stud, a ball socket, and a substrate comprising:
providing a ball socket comprising:
a lower body portion extending to an upper flange portion, wherein the lower body portion and upper flange portion are at least partially segmented by a plurality of longitudinal socket slots to form a plurality of longitudinally extending arms;
a plurality of longitudinally extending journaling ribs protruding radially from the lower body portion, wherein the ribs include an upper rib portion and a lower rib portion, and wherein the upper rib portion has a greater radial width than the lower rib portion;
a plurality of wedges extending radially outward along from the lower body portion;
a plurality of engagement tabs extending along from the lower body portion, each having a tab end portion; and
a ball stud engagement cavity centrally formed between the arms for receiving and pivotably securing a ball head of a ball stud therein;
aligning the plurality of journaling ribs with a plurality of journaling slots in a substrate having a substrate aperture extending therethrough;
inserting the ball socket through the substrate aperture until the upper rib portions abut a substrate top surface;
inserting the ball head of the ball stud into the ball stud engagement cavity of the ball socket; and
further inserting the ball socket through the substrate aperture until the upper flange portion of the ball socket abuts the substrate top surface and the tab end portions of the engagement tabs are positioned on a bottom surface of the substrate.

17. The method of claim 16, further comprising inserting the ball socket through the substrate aperture until wedge top surfaces of the wedges pass through the substrate aperture.

18. The method of claim 17, further comprising, during insertion of the ball socket through the substrate aperture until the upper rib portions abut the substrate top surface, substantially preventing inward flexing of the arms.

19. The method of claim 18, wherein preventing inward flexing of the arms includes positioning a center post of an installation tool between the arms.

20. The method of claim 18, further comprising inserting an adjustment tool through a conical opening in the ball socket, engaging the adjustment tool with a ball head drive portion in the ball head, and rotating the ball stud.

* * * * *